(12) United States Patent
Murase et al.

(10) Patent No.: US 8,025,816 B2
(45) Date of Patent: *Sep. 27, 2011

(54) SEMICONDUCTOR SUPERFINE PARTICLE PHOSPHOR AND LIGHT EMITTING DEVICE

(75) Inventors: Norio Murase, Ikeda (JP); Masanori Ando, Ikeda (JP)

(73) Assignee: National Institute of Advanced Industrial Science and Technology, Tokyo (JP)

( * ) Notice: Subject to any disclaimer, the term of this patent is extended or adjusted under 35 U.S.C. 154(b) by 627 days.

This patent is subject to a terminal disclaimer.

(21) Appl. No.: 10/518,216

(22) PCT Filed: May 6, 2003

(86) PCT No.: PCT/JP03/05648
§ 371 (c)(1),
(2), (4) Date: Sep. 26, 2005

(87) PCT Pub. No.: WO04/000971
PCT Pub. Date: Dec. 31, 2003

(65) Prior Publication Data
US 2006/0097624 A1  May 11, 2006

(30) Foreign Application Priority Data

Jun. 19, 2002 (JP) ................................ 2002-178449

(51) Int. Cl.
*C09K 11/02* (2006.01)
*C09K 11/08* (2006.01)
*C09K 11/56* (2006.01)
*C09K 11/54* (2006.01)

(52) U.S. Cl. ...... 252/301.36; 252/301.4 S; 252/301.6 S; 313/483; 313/485; 313/486; 427/489; 427/515

(58) Field of Classification Search 252/301.4–301.6 R, 252/301.36, 301.4 S, 301.6 S; 313/483, 485, 313/486; 427/489, 515
See application file for complete search history.

(56) References Cited

U.S. PATENT DOCUMENTS

| | | | |
|---|---|---|---|
| 5,093,286 A * | 3/1992 | Nogami et al. ............... | 501/17 |
| 5,585,640 A | 12/1996 | Huston et al. | |
| 5,866,039 A | 2/1999 | Morton | |
| 6,501,091 B1 * | 12/2002 | Bawendi et al. ............... | 257/14 |
| 7,226,953 B1 * | 6/2007 | Petruska et al. ............... | 516/98 |
| 2002/0110180 A1 * | 8/2002 | Barney et al. ............... | 374/161 |

FOREIGN PATENT DOCUMENTS

| JP | 09-227861 | 9/1997 |
|---|---|---|
| JP | 2000-265166 | 9/2000 |
| WO | WO 95/18196 | 7/1995 |
| WO | WO 99/21934 | 5/1999 |
| WO | WO 99/50916 A1 | 10/1999 |
| WO | WO 00/17655 A1 | 3/2000 |
| WO | WO 00/17656 | 3/2000 |

OTHER PUBLICATIONS

Chia et al, Cadmium telluride quantum dot-doped glass by the sol-gel technique, 1997, SPIE vol. 3136, pp. 337-347.*
Takada et al, Control of Particle Size Distribution of CdS Quantum dots in Gel Matrix, Journal of Sol-Gel Science and Technology 1, 1995, pp. 123-132.*
Talapin. Synthesis and surface modification of amino-stabilized CdSe, CdTe and InP nanocrystals. Colloids and Surfaces A 202 145-54.*
Selvan Synthesis of tunable, Highly Luminescent QD-glasses Through Sol-Gel Processing. Adv Mater. 2001, 13, No. 12-13.*
S. Tamil Selvan et al., "Synthesis of Tunable, Highly Luminescent QD-Glasses Through Sol-Gel Processing," Advanced Materials, 2001, vol. 13, No. 12-13, pp. 985-988.
Miguel A. Correa-Duarte, "Photodegradation of $SiO_2$—Coated CdS Nanoparticles within Silica Gels," Journal of Nanoscience and Nanotechnology, 2001, vol. 1, No. 1, pp. 95-99.
Mingyuan Gao, et a., "Strongly Photoluminescent CdTe Nanocrystals by Proper Surface Modification," J. Phys. Chem., B 1998, 102, pp. 8360-8363.
William R. Dawson, et al., "Fluorescence Yields of Aromatic Compounds," J. Phys. Chem., 1968, vol. 72, pp. 3251-3260.
B. O. Dabbousi, et al., "(CdSe)ZnS Core-Shell Quantum Dots: Synthesis and Characterization fo a Size Series of Highly Luminescent Nanocrystallites," J. Phys. Chem., B 1997, 101, pp. 9463-9475.
Jinwook Lee, et al., "Full Color Emission from II-VI Semiconductor Quantum Dot-Polymer Composites," Advanced Materials, 2000, vol. 12, No. 15, pp. 1102-1105.
Murase N. Gao MY, et al., "Synthesis and optical properties of water soluble ZnSe nanocrystals," International Journal of Modern Physics B, 2001, 15(28-30) 3881-3884 Dec. 10, 2001.
M. Nirmal, et al., "Fluorescence intermittency in single cadmium selenide nanocrystals," Nature, 1996, vol. 383, pp. 802-804.
Kapitonov, A.M. et al. (1999) "Luminescence properties of thiol-stabilized CDTE nanocrystals" Journal of Physical Chemistry. B, Materials, Surfaces, Interfaces and Biophysical 103:10109-10113.
Rogach, A. et al. (2000) "Raisin-bun-type composite spheres of silica and semiconductor nanocrystals" Chemistry of Materials, American Chemical Society 12:2676-2685.

(Continued)

*Primary Examiner* — Carol M Koslow
*Assistant Examiner* — Matthew E Hoban
(74) *Attorney, Agent, or Firm* — Kratz, Quintos & Hanson, LLP

(57) ABSTRACT

This invention provides a novel phosphor material that has better brightness than conventional phosphors using dispersed rare earth ions, and that possesses excellent light resistance, temporal stability, and the like, and a light-emitting device with high brightness comprising such phosphor material and an excitation ultraviolet light source corresponding to the properties thereof. A phosphor comprising a silicon-containing solid matrix and semiconductor superfine particles dispersed therein at a concentration of $5 \times 10^{-4}$ to $1 \times 10^{-2}$ mol/L, said semiconductor superfine particles having a fluorescence quantum yield of 3% or greater and a diameter of 1.5 to 5 nm, and a light-emitting device including said phosphor and a light source for excitation light with an intensity of 3 to 800 $W/cm^2$.

19 Claims, 3 Drawing Sheets

OTHER PUBLICATIONS

Supplemental European Search Report from corresponding European patent application No. EP 03 72 5759.

C. Lorenz et al.: "Aerogels containing strongly photoluminescing zinc oxide nanocrystals", Elsevier Science B.V., *Journal of Non-Crystalline Solids* 238 (1998), pp. 1-5.

A. Gabel et al.: "Efficient degenerate four-wave mixing in an ion-exchanged semiconductor-doped glass waveguide", *Appl. Phys. Lett.* 51 (21), Nov. 23, 1987, pp. 1682-1684.

C.J. Brinker et al.: "Sol→Gel→Glass: II. Physical and Structural Evolution During Constant Heating Rate Experiments", *Journal of Non-Crystalline Solids* 72 (1985), pp. 345-368.

Seizo Miyata: "Nonlinear Optics of Organic Molecules and Polymers", CRC Press, 1977, 4 pages.

Andrey L. Rogach: "Nanocrystalline CdTe and CdTe(S) particles: wet chemical preparation, size-dependent optical properties and perspectives of optoelectronic applications", *Materials Science & Engineering B69-70* (2000), pp. 435-440.

A. Ekimov: "Growth and optical properties of semiconductor nanocrystals in a glass matrix", *Journal of Luminescence 70* (1996) pp. 1-20.

Anna B. Wojcik et al.: "Transparent Inorganic/Organic Copolymers by the Sol-Gel Process: Thermal Behavior of Copolymers of Tetraethyl Orthosilicate (TEOS), Vinyl Triethoxysilane (VTES) and (Meth)acrylate Monomers", Journal of Sol-Gel Science and Technology, 5, 77-82 (1995), 6 pages.

* cited by examiner

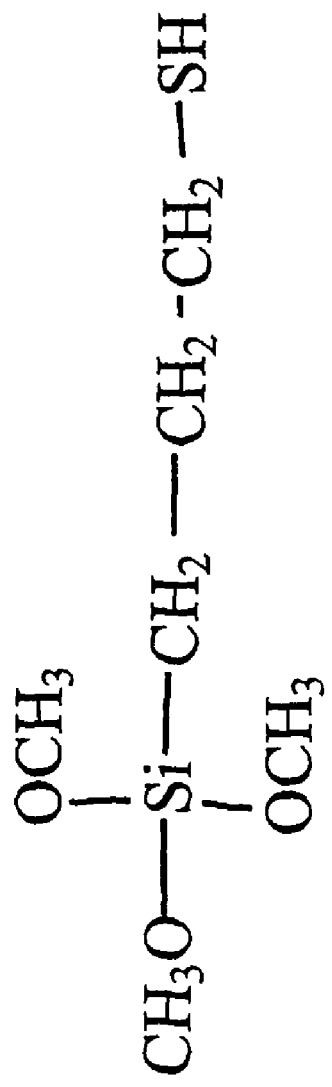
Fig. 3   MPS (MERCAPTOPROPYL TRIMETHOXYSILANE)

A typical example of such superfine particles produced in
SEMICONDUCTOR SUPERFINE PARTICLE PHOSPHOR AND LIGHT EMITTING DEVICE This application is the U.S. National Phase under 35 U.S.C. §371 of International Application PCT/JP2003/005648, filed May 6, 2003, which claims priority to Japanese Patent Application No. 2002-178449, filed Jun. 19, 2002. The International Application was published under PCT Article 21(2) in English.

TECHNICAL FIELD

The present invention relates to a phosphor obtained by dispersing photoluminescent semiconductor superfine particles in a matrix, and to a display panel or other light-emitting device obtained using this phosphor.

BACKGROUND OF THE INVENTION

In the currently ongoing information technology revolution, display elements, assemblies thereof such as displays, and other optical devices play an important role as interfaces between people and various types of equipment. Such display elements are constantly required to have higher brightnesses and higher resolutions, and must also be as thin and lightweight as possible and consume minimum energy. Phosphors with high brightness and fluorescence quantum yield are indispensable to meeting such requirements.

Inorganic matrices in which primarily rare earth ions or transition metal ions are dispersed have so far been used as phosphors. These phosphors have been researched extensively and are being constantly improved because rare earth ions and transition metal ions change little over time and are degraded only minimally by light irradiation in comparison with organic pigments. However, the transitions of such ions often have a forbidden character, and hence their emission lifetime is about 1 ms (millisecond). Accordingly, irradiating such ions with intense excitation light in an attempt to achieve higher brightness fails to rapidly convert this light to the desired light, and the phenomenon called brightness saturation occurs. This phenomenon is a major obstacle to ensuring higher brightness through the use of rare earth ions or transition metal ions. To overcome this shortcoming, it is necessary to find novel light-emitting materials that lie outside the traditional and conventional ways of thinking.

In recent years, attention has been drawn to the discovery that surface-treated semiconductor superfine particles emit light with high efficiency. Typical examples of semiconductor superfine particles are particles of Group II-VI compounds whose diameters are on the order of several nanometers. These particles display so-called quantum size effects, with smaller particles having an increase band gap. For this reason, such particles can emit various colors depending on the particle size even when all are irradiated with ultraviolet light of the same wavelength, with smaller particles emitting shorter wavelengths of light. For example, cadmium telluride emits yellowish red light when in the form of particles with a diameter of about 5 nm, and green light when in the form of particles with a diameter of about 3 nm. The emission lifetime of these semiconductor superfine particles is about 10 ns (nanosecond). For this reason, excitation light can be converted to the necessary light five orders of magnitude more rapidly than with a phosphor based on rare earth ions or transition metal ions, and the excitation light can be reabsorbed and emitted, making it possible to ensure extremely high brightness. Another advantage is the ability to promptly follow the ON and OFF cycles of excitation light.

It should be noted, however, that such semiconductor superfine particles have a large surface area because of their small particle size, for which reason reducing the number of surface defects by a surface treatment to suppress radiationless deactivation is important for raising the fluorescence quantum yield. Sulfur-containing compounds can suitably be used for such surface treatments. Typical examples include thiols and other organic surfactants, as well as zinc sulfide. Since semiconductor superfine particles whose surfaces are thoroughly coated using such compounds are incredibly bright, it has been shown in the latest research that emission from each individual particle can be separately detected and optically resolved. This can be regarded as an excellent characteristic unattainable with a rare earth or transition metal phosphor. Another significant advantage of semiconductor superfine particles is that various colors can be emitted in accordance with the particle size by irradiating the particles with light whose single wavelength is shorter, that is, has higher energy, than the band gap. In other words, the advantage of such phosphors is that the excitation wavelength can be freely selected and that even when the same material is used emission with the desired wavelength can be obtained by varying the particle size.

Such semiconductor superfine particles are currently produced by a colloidal method. There are two types of particles: those that are produced in aqueous solutions, and those that are produced in nonaqueous solutions.

A typical example of such superfine particles produced in aqueous solutions is cadmium telluride, which has a fluorescence quantum yield of several percent (Gao, et al., *Journal of Physical Chemistry*, B, vol. 102, p. 8360 (1998)). The quantum yield value is calculated based on a reported method in which the molar absorbance coefficient and the quantum yield are compared with those of a known pigment molecule (Dawson, et al., *Journal of Physical Chemistry*, vol. 72, p. 3251 (1968)).

Semiconductor superfine particles produced by this method are however stabilized with a surfactant and dispersed in an aqueous solution, and are essentially incapable of producing a monodisperse system in water without a surfactant, making it difficult to raise the dispersion concentration.

A process by which superfine particles are produced using organometallic pyrolysis is known as a method for producing such phosphors in a nonaqueous solution (Bawendi, et al., *Journal of Physical Chemistry*, B, vol. 101, p. 9463 (1997)). This method is advantageous in that, for example, a quantum yield in excess of 20% can be obtained with superfine particles of cadmium selenide, and although the resulting superfine particles as such are insoluble in water, coating the surface with ionic organic molecules allows the particles to form a monodisperse system in water and to be handled in the same way as the previously described cadmium telluride particles obtained from aqueous solutions. However, this method requires expensive and complicated experimental equipment. Another drawback is that in most cases superfine particles thus produced remain stable in water for only about a few hours, and this instability is a big factor impeding the practical application of particles produced in nonaqueous solvents.

Thus, surface-coated semiconductor superfine particles in solution emit extremely bright light but are unstable. When left unchanged, superfine particles of cadmium telluride obtained by the aqueous solution method usually aggregate and precipitate in about two weeks in air at room temperature. For this reason, the emission performance cannot be maintained for a long time, and the particles lack practicality as an engineering material.

Several attempts have therefore been made to support and stabilize such surface-coated semiconductor superfine particles in a solid matrix. There is, for example, a report concerning a method for fixing such particles in an organic polymer (Bawendi, et al., *Advanced Materials*, vol. 12, p. 1103 (2000)). However, polymers used as a matrix have inferior light resistance, heat resistance, and other properties in comparison with silicon-containing glass materials, and gradually permit water and oxygen. The resulting drawback is a gradual degradation of the superfine particles thus fixed. In addition, in a mixture of superfine particles as an inorganic material and a polymer as an organic material, the superfine particles are apt to aggregate if the dispersion concentration of the superfine particles is high, and therefore the phosphor tend to have inferior characteristics as a light-emitting material.

To overcome the drawbacks of such polymer matrices, an attempt has been made to disperse superfine particles in a glass matrix by a sol-gel process using a tetraalkoxysilane (Selvan, et al., *Advanced Materials*, vol. 13, p. 985 (2001)). In this method, however, the superfine particles are insoluble in water, so usable sol-gel processes are limited and only gelled products can be obtained. In addition, the dispersion concentration of the superfine particles in a glass matrix has a low upper limit of only about 0.1 vol % (about $1 \times 10^{-4}$ mol/L when the particle diameter is 3 nm), which is insufficient for obtaining a fluorescence intensity greater than that of the currently used rare earth or transition metal phosphors.

DISCLOSURE OF THE INVENTION

It is a primary object of the present invention to provide a novel phosphor material that has better brightness than conventional phosphors using dispersed rare earth ions, and that possesses excellent light resistance, temporal stability, and the like.

It is another object of the present invention to provide a display panel or other light-emitting device in which high brightness and other excellent characteristics can be obtained using such a phosphor material.

As a result of extensive research conducted in view of the drawbacks of the prior art, the inventors succeeded in obtaining a novel phosphor whose brightness characteristics exceed those of conventional phosphors by supporting photoluminescent semiconductor superfine particles in a silicon-containing matrix at a high concentration within a specific range by using a sol-gel process.

The inventors also succeeded in producing a high-performance light-emitting device by irradiating such a phosphor with ultraviolet light of appropriate strength.

Specifically, the present invention provides the following semiconductor superfine particulate phosphors, light-emitting devices, and the like.

Item 1. A phosphor comprising a silicon-containing solid matrix and semiconductor superfine particles dispersed therein at a concentration of $5 \times 10^{-4}$ to $1 \times 10^{-2}$ mol/L, said semiconductor superfine particles having a fluorescence quantum yield of 3% or greater and a diameter of 1.5 to 5 nm.

Item 2. The phosphor according to item 1, wherein the silicon-containing solid matrix is a glass matrix formed by a sol-gel process.

Item 3. The phosphor according to item 2, wherein the silicon-containing solid matrix is a glass matrix formed by a sol-gel process using an organoalkoxysilane.

Item 4. The phosphor according to item 3, wherein the organoalkoxysilane is a compound expressed by the formula:

$$X_n\text{—Si}(OR^1)_{4-n} \quad (I)$$

wherein X is a group expressed by $CH_2$=CH—, an oxirane-containing group, a group expressed by $H_2C_mH_{2m}$—, a group expressed by $CH_2$=$C(CH_3)COOC_pH_{2p}$—, a group expressed by $HSC_qH_{2q}$—, or a phenyl group; $R^1$ is a lower alkyl group; n is 1, 2, or 3; m is an integer from 1 to 6; p is an integer from 1 to 5; and q is an integer from 1 to 10.

Item 5. The phosphor according to any one of items 1 through 4, wherein the semiconductor superfine particles are substantially monodispersed in the silicon-containing solid matrix.

Item 6. The phosphor according to item 5, wherein the semiconductor superfine particles comprise at least one member selected from the group consisting of cadmium telluride, zinc telluride, zinc selenide, cadmium selenide, cadmium sulfide, indium arsenide, and indium phosphide.

Item 7. The phosphor according to item 6, wherein the semiconductor superfine particles comprise cadmium telluride, and the superfine particles are obtainable by adding a surfactant to an aqueous solution of cadmium perchlorate, adding hydrogen telluride or sodium hydrogen telluride, and then refluxing the mixture.

Item 8. The phosphor according to item 1, wherein the concentration of semiconductor superfine particles in the silicon-containing solid matrix is $1 \times 10^{-3}$ to $8 \times 10^{-3}$ mol/L.

Item 9. A light-emitting device comprising the phosphor according to item 1, and a light source for emitting excitation light with an intensity of 3 to 800 $W/cm^2$.

Item 10. A light-emitting device comprising the phosphor according to item 1, and a light source selected from the group consisting of a mercury lamp, a semiconductor light-emitting diode, a semiconductor laser, and a solid-state laser.

Item 11. The light-emitting device according to item 10, wherein the light source is a semiconductor light-emitting diode, semiconductor laser, or solid-state laser.

Item 12. The light-emitting device according to any one of items 9 through 11, wherein the light source is an ultraviolet semiconductor light-emitting diode with an excitation wavelength of 200 nm or greater but less than 400 nm, or an ultraviolet semiconductor laser with an excitation wavelength of 200 nm or greater but less than 400 nm.

Item 13. The light-emitting device according to any one of items 9 through 12, wherein the light source is an intermittently pulsing light source.

Item 14. The light-emitting device according to any one of items 9 through 13, wherein the optical density (OD) of the phosphor according to item 1 at the excitation wavelength is 0.7<OD<5.

Item 15. The light-emitting device according to any one of items 9 through 14, wherein the light-emitting device is a display panel or a light.

Item 16. A method for manufacturing a display panel, wherein a slurry containing pulverized phosphor according to item 1, a water-soluble photosensitive resin, and water, is applied to a substrate, and the resin is cured by irradiation with light.

Item 17. A thin film comprising the phosphor according to item 1.

Item 18. The thin film according to item 17, wherein the film thickness is 10 microns or less.

Item 19. A method for forming a thin film comprising the phosphor according to item 1, wherein the film is produced by a sol-gel process using an organoalkoxysilane.

Item 20. A method for forming on a substrate a thin film comprising the phosphor according to item 1, wherein the film is produced by a sol-gel process using an organoalkoxysilane.

Item 21. A method for manufacturing the phosphor according to item 1, wherein the semiconductor superfine particles are fixed in the silicon-containing solid matrix and are then exposed to a reducing gas.

Item 22. The method for manufacturing a phosphor according to item 21, wherein the semiconductor superfine particles are fixed in the silicon-containing solid matrix by a sol-gel process using an organoalkoxysilane and are then exposed to hydrogen gas or hydrogen sulfide gas.

Item 23. A phosphor obtainable by the manufacturing method according to item 21 or 22.

Item 24. A light-emitting device comprising the phosphor according to item 23 and a light source for emitting excitation light with an intensity of 3 to 800 W/cm$^2$.

BRIEF DESCRIPTION OF THE DRAWINGS

FIG. 3 is a diagram showing the structural formula of mercaptopropyltrimethoxysilane (MPS), which is a starting material for a silicon-containing solid matrix.

DETAILED DESCRIPTION OF THE INVENTION

Figure 1:
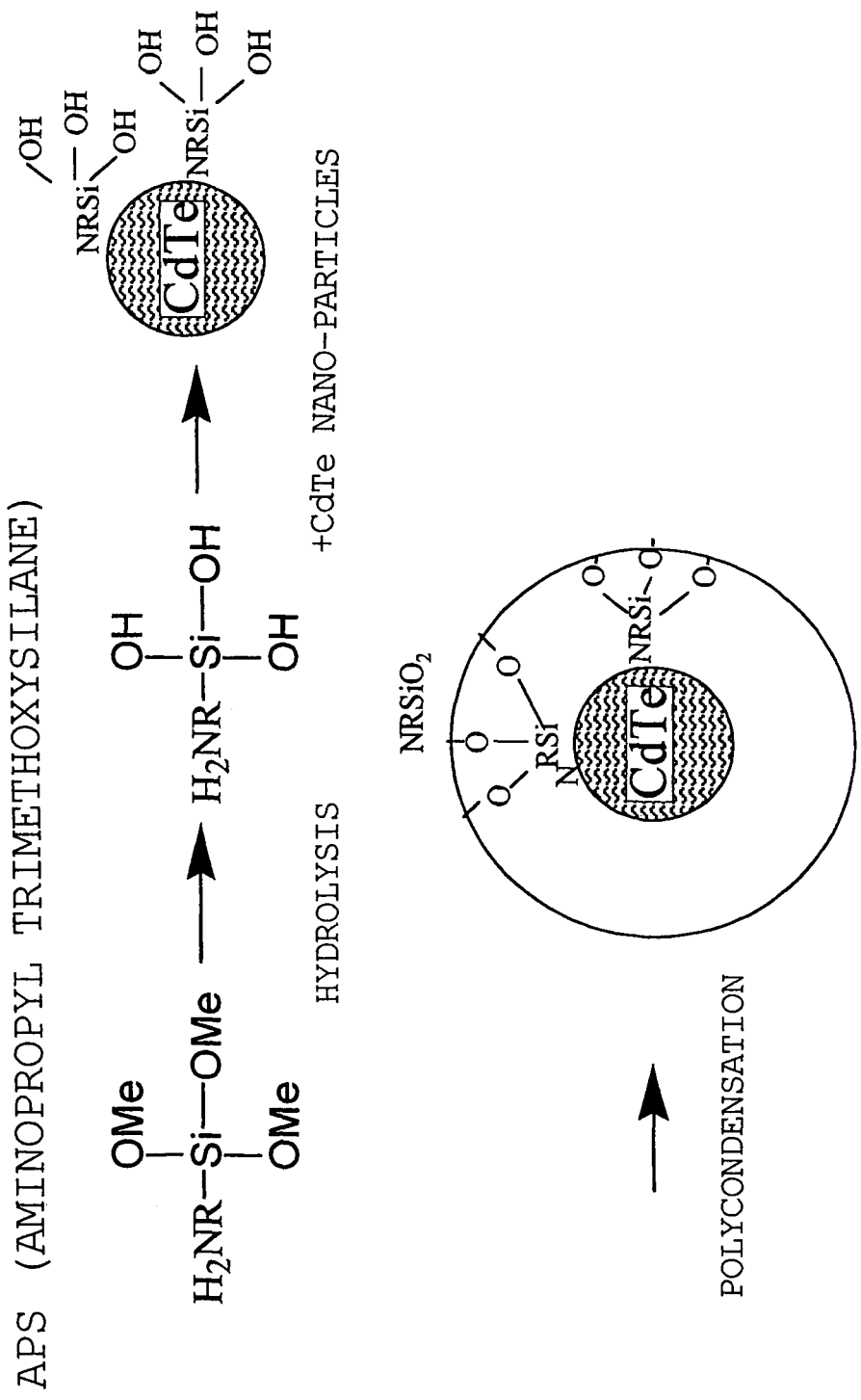
FIG. 1 is a schematic view showing a reaction for producing a silicon-containing solid matrix in which semiconductor superfine particles are dispersed, where R is —CH$_2$CH$_2$CH$_2$—.

The phosphor according to the present invention has a constitution such that semiconductor superfine particles are dispersed in a matrix that contains silicon etc.

In addition, a light-emitting device according to the present invention comprises the phosphor, a light source with an appropriate strength of excitation light, and an optical system. The semiconductor superfine particles, matrix, excitation light source, and light-emitting device will now be described in turn.

1. Semiconductor Superfine Particles

Examples of semiconductor superfine particles include particles comprising the following Group II-VI semiconductors that undergo direct transitions and emit light in the visible range: cadmium sulfide, zinc selenide, cadmium selenide, zinc telluride, and cadmium telluride. Additional examples include indium arsenide (InAs), indium phosphide (InP), and other Group III-V compounds.

Semiconductor superfine particles that form a monodisperse system in water and have a quantum yield of 3% or greater are preferably used. Using such superfine particles allows the particles to form a monodisperse system in a solid matrix without aggregation when the matrix is manufactured under appropriate conditions by a common sol-gel process using water. The closer the quantum yield of the semiconductor superfine particles to 100%, the better the results obtained, but in reality, the yield is equal to about several percent. Since it is impossible to obtain adequate fluorescence intensity when the quantum yield is too low, it is desirable from a practical standpoint to keep the efficiency at 3% or greater.

Semiconductor superfine particles capable of forming a monodisperse system in water can be produced by the aqueous solution process described by Gao et al. in *The Journal of Physical Chemistry*, B, vol. 102, p. 8360 (1998). In this method, for example, superfine particles of cadmium telluride can be produced by adding thioglycolic acid as a surfactant to an aqueous solution of cadmium perchlorate whose pH is adjusted to about 11 to 12, introducing hydrogen telluride or sodium hydrogen telluride in an inert gas atmosphere, and then refluxing the system. Zinc selenide, cadmium selenide, zinc telluride, cadmium telluride, and other semiconductor superfine particles can also be produced by similar methods through the use of materials that correspond to the composition of the superfine particles, as described below.

Specifically, when semiconductors with various such chemical compositions are used, the fluorescence quantum yield can be raised using other surfactants in accordance with the chemical composition. For example, thioglycerol is preferably used instead of thioglycolic acid when semiconductor superfine particles of zinc selenide are to be produced. Such production techniques are described in detail in a recent publication by the inventors et al. (Murase, et al., *International Journal of Modern Physics*, B, vol. 15, p. 3881 (2001)).

Another technique for producing semiconductor superfine particles capable of forming a monodisperse system in water is one in which an organometallic compound containing a Group II metal atom is pyrolyzed in an organic solvent and is then subjected to surface modification. This technique is described in detail in WO 00/17655 and WO 00/17656. In this technique, superfine particles are first produced by the following organometallic process. Specifically, an organometallic compound (dimethyl cadmium or another substance in which alkyl groups and a metal are directly chemically bonded) is injected at a high temperature of about 300° C. into an organophosphorus compound (specifically, trioctyl phosphoric acid, trioctyl phosphoric oxide, or another substance in which alkyl groups and phosphorus are directly chemically bonded) to obtain semiconductor superfine particles. The particle surfaces can be further coated with zinc sulfide or another semiconductor as needed. Subsequently, for example, molecules containing a thiol or other hydrophobic group and carboxyl or other hydrophilic groups are bound to the surface of the superfine particles to produce semiconductor superfine particles capable of forming a monodisperse system in water.

Examples of such molecules include compounds expressed by the general formula $H_yX^1((CH_2)_tCOOH)_z$ (wherein $X^1$ is N or S, t is an integer from 5 to 20, and y and z are integers selected so as to satisfy the requirements of the valency of $X^1$), and salts thereof. Specific examples include $HS(CH_2)_tCOOH$, $H_2N(CH_2)_tCOOH$, $HN((CH_2)_tCOOH)_2$, and salts thereof. Examples of such salts include sodium, potassium, and other alkali metals salts. It is preferable for t to be an integer from 6 to 15, and more preferably an integer from 7 to 13. Among these, thiols (i.e. $X^1$ is S) are preferable, and mercaptoundecanoic acid ($HS(CH_2)_{10}COOH$) is particularly preferable.

The superfine particles thus manufactured have characteristics on a par with those of particles produced from the aforementioned aqueous solution, and can be handled in the same manner. It should be noted, however, that cadmium telluride produced by the aqueous solution method is preferred for long-term stability.

The semiconductor superfine particles usually have a particle size of several nanometers. The particle size and type of compound determine the emitted color, and particles with smaller sizes emit shorter wavelengths of light. In the case of cadmium selenide, for example, blue light is emitted by particles with a diameter of 2 to 3 nm, green light is emitted by particles with a diameter of 3 to 4 nm, and red light is emitted by particles with a diameter of 4 to 5 nm, although the actual results vary with the condition of the surface coating. If the semiconductor superfine particles have an excessively small size, the specific surface area increases dramatically, and it becomes impossible to adequately remove surface defects. By contrast, a size that is too large results in excessively narrow gaps between the particles and makes it difficult to disperse the semiconductor superfine particles in the solid matrix in high concentration. Taking all these factors into account, it follows that the semiconductor superfine particles should preferably have a size (diameter) within a range of 1.5 to 5 nm.

The size of the semiconductor superfine particles can be controlled by the reflux time in the particle production process. To obtain superfine particles that emit monochromatic light, the reflux time should be kept constant and the process adjusted so that the standard deviation of the size distribution is 20% or less of the mean particle size. It is unsuitable for the standard deviation of the size distribution to exceed 20% because in this case various types of light mix with each other, and it becomes difficult to obtain the color tone required for the display material.

2. Matrix

The inventors tried to use methods based on reverse micelle processes or the Stoeber process as the sol-gel process in order to disperse semiconductor superfine particles in a silicon-containing solid matrix. However, these processes were not necessarily suitable for ensuring a sufficient increase in the concentration of semiconductor superfine particles while maintaining the required fluorescence quantum yield.

As a result of intensive research into matrix-forming materials conducted in view of the above, it was discovered that a group of compounds collectively known as organoalkoxysilanes could be used as at least one of the matrix-forming materials. The term "organoalkoxysilane" refers to a group of compounds that have a silicon-containing skeleton structure in which at least one of the four bonds of silicon is to a carbon atom rather than to an alkoxide, and refers to a group of compounds otherwise known as silane coupling agents. Specifically, the term refers to compounds expressed by General Formula (I):

$$X_n\text{—}Si(OR^1)_{4-n} \quad (1)$$

wherein X is a group expressed by $CH_2\text{=}CH\text{—}$, an oxirane-containing group, a group expressed by $H_2NC_mH_{2m}\text{—}$, a group expressed by $CH_2\text{=}C(CH_3)COOC_pH_{2p}\text{—}$, a group expressed by $HSC_qH_{2q}\text{—}$, or a phenyl group; $R^1$ is a lower alkyl group; n is 1, 2, or 3; m is an integer from 1 to 6; p is an integer from 1 to 5; and q is an integer from 1 to 10. As used herein, the phrase "oxirane-containing group" refers to a group expressed by the formula

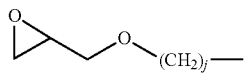

wherein j is an integer from 2 to 6. Examples of lower alkyl groups expressed by $R^1$ include $C_1$ to $C_6$ linear and branched alkyl groups. Preferable examples include $C_1$ to $C_4$ linear and branched alkyl groups, and more preferable examples include methyl, ethyl, n-propyl, and isopropyl groups. Methyl and ethyl groups are particularly preferable.

Among the organic compounds expressed by General Formula (I), those for which n is 1, m is an integer from 2 to 4, p is an integer from 2 to 4, and q is an integer from 2 to 4 are suitable. In particular, those for which n is 1, m is 3, p is 3 and q is 3 are suitable. With X, groups expressed by $H_2N(CH_2)_m\text{—}$ (wherein m is an integer from 2 to 4) and groups expressed by $HS(CH_2)_q\text{—}$ (wherein q is an integer from 2 to 4) are suitable.

Specifically, 3-aminopropyltrimethoxysilane (APS) and mercaptopropyltrimethoxysilane (MPS) are suitable.

The silicon-containing solid matrix of the present invention can be appropriately formed by a sol-gel process using organoalkoxysilane (I). The phosphor of the present invention can be appropriately manufactured by forming a monodisperse system of the semiconductor superfine particles in organoalkoxysilane (I) and solidifying the product by a sol-gel process. In the present invention, phosphors of various colors can be separately produced by varying the size of the semiconductor superfine particles which are used to form the monodisperse system in the matrix. In the case of cadmium selenide particles, for example, it is possible to separately produce phosphors that emit blue light (diameter: about 2 to 3 nm), green light (diameter: about 3 to 4 nm), and red light (diameter: 4 to 5 nm).

Besides organoalkoxysilane (I), an ordinary tetrafunctional alkoxide (compound with n=0 in formula (I)) and/or a polymer may also be added as a matrix-forming material as long as the effects of the present invention are not compromised. The dispersibility of the superfine particles and/or the mechanical properties of the phosphor can sometimes thereby be improved. When, for example, organoalkoxysilane (I) and a tetrafunctional alkoxide are used as matrix-forming materials, the molar ratio of organoalkoxysilane (I) and tetrafunctional alkoxide may be about 100:0 to 20:80.

It is believed that organoalkoxysilane (I) forms a vitreous network structure $(\text{—}O\text{—}Si\text{—})_k$, (wherein k>1) by a reaction similar to the sol-gel reaction (hydrolysis and dehydropolycondensation) involving an ordinary tetrafunctional alkoxide, and the functional group moiety expressed by X above interacts with the surface of the semiconductor superfine particles to stabilize them. A resulting advantage is that the superfine particles are fixed in a substantially monodisperse state in the matrix without undergoing aggregation and inducing changes in the condition of the surfaces. As a result, the dispersion concentration of the semiconductor superfine particles in the matrix can be increased to an appropriate concentration within the range of $5\times10^{-4}$ to $1\times10^{-2}$ mol/L. If a monodisperse system does not form, aggregation occurs and a situation essentially equivalent to an increase in the particle size is encountered, with the peak wavelength of the emission spectrum shifting toward longer wavelengths. Even if the concentration is increased, a substantially monodisperse system is considered to be maintained as long as the shift of the peak wavelength toward longer wavelengths is 10 nm or less.

The increase in emission brightness saturates, however, if the dispersion concentration exceeds $1\times10^{-2}$ mol/L. This is because in the known phenomenon of concentration quenching in rare earth phosphors and transition metal phosphors, the energy absorbed by superfine particles is transferred sequentially to adjacent superfine particles before being released as fluorescence, and is hence not used for light emission.

The fluorescence intensity of a phosphor can be estimated as the product of "concentration of particles in the phosphor" and "excitation light intensity" under conditions that the quantum yield minimally changes when the excitation light is weak enough not to cause the phosphor to saturate. In currently used rare earth phosphors and transition metal phosphors, the concentration of the rare earth or transition metal in the phosphor is about 1 mol/L, and the excitation light intensity is about 0.03 W/cm². A concentration of 1 mol/L is the upper limit at which concentration quenching does not occur, and the excitation light intensity is set so as to not cause brightness saturation.

On the other hand, the concentration of the semiconductor superfine particles of the present invention has an upper limit of about $1\times10^{-2}$ mol/L. This is because the dipole moment of the semiconductor superfine particles is greater than that of rare earth ions, and absorbed energy is therefore more apt to migrate to adjacent particles. For this reason, the particle concentration in the present invention is a hundred times less than that of a phosphor based on rare earth or transition metal ions, so that a hundredfold greater excitation light intensity is needed, and an excitation light intensity of 3 W/cm² or greater is required in order to obtain a fluorescence intensity that is on a par with or greater than that of the currently used rare earth phosphors.

The semiconductor superfine particles do not saturate until the excitation light intensity is about 800 W/cm² since the excited state has a short lifetime. This is an excellent characteristic, and light of similar intensity is therefore irradiated'during detection of emission from each particle as those described in the prior art section of this specification. For example, an excitation light intensity of 700 W/cm² is used in a publication (Bawendi, et al., *Nature, vol.* 383, p. 802 (1996)).

An excitation light intensity that can be easily achieved as a feasible target is estimated to be about 60 W/cm². For this, the corresponding dispersion concentration must be $5\times10^{-4}$ mol/L or greater in order to obtain a fluorescence intensity equal to or greater than that of current rare earth or transition metal phosphors. Accordingly, the concentration of the semiconductor superfine particles in the present invention must be within a range of $5\times10^{-4}$ to $1\times10^{-2}$ mol/L to obtain a fluorescence intensity that is equal to or greater than that of existing phosphors. It is even more preferable for the concentration of the semiconductor superfine particles to be within a range of $1\times10^{-3}$ to $8\times10^{-3}$ mol/L in order to allow the phosphor of the present invention to emit sufficiently strong light while avoiding any phosphor loss. A range of $2\times10^{-3}$ to $5\times10^{-3}$ mol/L is particularly preferable.

3. Excitation Light Source

As indicated above, the ultraviolet excitation light intensity must be high in order to emit bright light in the present invention. This is because the density of excitation photons must be high in order to re-excite the semiconductor superfine particles quickly after they have returned to the ground state. Considered from a different perspective, the energy introduced must be increased in order to emit bright light, based on the law of conservation of energy.

As used herein, the term "ultraviolet light" refers to light with a wavelength of 200 nm or greater but less than 400 nm. Mercury lamps, semiconductor light-emitting diodes (LEDs), semiconductor lasers, and a solid-state lasers can be practically used as sources of such ultraviolet light. Among these light sources, a semiconductor LED, semiconductor laser, or solid-state laser is preferable. Examples of particularly preferable light sources include ultraviolet semiconductor light-emitting diodes with an excitation wavelength of 200 nm or greater but less than 400 nm, and ultraviolet semiconductor lasers with an excitation wavelength of 200 nm or greater but less than 400 nm.

The term "solid-state laser" refers to a laser with a solid lasing medium. Examples include lasers in which near-infrared light is emitted using neodymium:YAG or neodymium vanadate and the third harmonic of this light is output. With the exception of solid-state lasers, the intensity of excitation light generated by these light sources has an upper limit of several tens of watts per square centimeter. To obtain a greater output, it is necessary to use exceptionally large power sources and lamps or to employ a gas laser. With solid-state lasers, on the other hand, pulsing as described below can be used, and an output of 1000 W/cm² can therefore be achieved with relative ease. Accordingly, when conducting the present invention, the excitation light intensity of ultraviolet light must be set within a range of 3 to 800 W/cm² as described above in order to obtain fluorescence intensity equal to or greater than that of rare earth or other current phosphors and to suppress brightness saturation. In practical terms, an intensity of 3 to 60 W/cm² is desirable from among those indicated above, and an intensity of 6 to 30 W/cm² is more preferable in order to reduce power consumption while emitting sufficiently strong light.

When the excitation light is pulsed light from a light source that generates pulses in an intermittent manner, the P value calculated using the following formula (II)

$$P=A/(t\cdot N) \quad (II)$$

is defined as the excitation light intensity in the present invention. In formula, P is the excitation light intensity (W/cm²), t is the duration of pulsed light (seconds), N is the number of pulses per second (Hz i.e. 1/seconds), and A is the mean output per second (W/cm²). In other words, P is the mean output in the interval t (seconds) during which pulsed light continues. In formula (II), $t\cdot N$ is the proportion of time during which the laser is ON over a period of 1 second, and the reciprocal of this is referred to as "duty." When $t\cdot N$ is equal to 1, continuous light is emitted, the condition P=A is satisfied, and the mean output A per second and the excitation light intensity P described in this specification become equal to each other. For example, based on formula (II), the excitation light intensity P per pulse is 10 W/cm² if the pulse duration t is 10 msec, the number of pulses N is 10 Hz, and the mean output A per second is 1 W/cm².

4. Light-Emitting Device

A display panel can be cited as an example of a light-emitting device of the present invention. A display panel may, for example, have the following structure. Minute spots designed to emit red, green, and blue light comprising phosphors of the present invention are formed on a substrate, and a mercury lamp, semiconductor LED, semiconductor laser, solid-state laser, or other light source capable of emitting light in the ultraviolet range is disposed so that the intensity of light is modulated and the minute spots are irradiated with the light in accordance with information signals.

A display panel may, for example, be manufactured in the following manner. First, blue, green or red phosphor is each manufactured by the aforementioned sol-gel process in accordance with the size of the semiconductor superfine particles. The phosphors thus manufactured are pulverized to powder, admixed with water, and made into slurries. A water-soluble photosensitive resin (such as that obtained by adding ammonium dichromate to polyvinyl alcohol) is admixed with each slurry and applied to a substrate. The contained moisture is vaporized off, yielding a solid. The solid is irradiated with light from a high-pressure mercury lamp, so that only the photosensitive resin portions irradiated with light are cured and rendered insoluble in water. Only the photosensitive portions of the phosphor are subsequently left when the substrate is quickly washed with water, and the desired display panel is obtained.

Lamps may be cited as another example of a light-emitting device. Among such lamps, those that emit white light are particularly useful in practice. When ultraviolet light is used as excitation light, the desired white color can be obtained by exciting three phosphors that each emits one of blue, green, and red light.

When the phosphor of the present invention is to be used for such a light-emitting device, the optical density (OD) of the phosphor must be adjusted to an optimal level. The optical density OD, also known as absorbance, can be written as $$OD = \epsilon_\lambda cL$$

wherein $\epsilon_\lambda$ is the molar absorption coefficient of the phosphor at excitation wavelength $\lambda$, c is the concentration of superfine particles, and L is the thickness of the phosphor. This relation is widely known as the Lambert-Beer law, according to which excitation light is absorbed by a phosphor to the extent of $10^{-OD}$. When excitation is performed by ultraviolet light, the OD should preferably be within the following range.

$$0.7 < OD < 5$$

If the OD is below this range, the excitation light will not be adequately absorbed and biologically harmful ultraviolet light will sometimes escape outside. If the OD is greater than this range, material will be wasted and the production process will becomes complicated. In the phosphor of the present invention, the molar absorption coefficient increases with reduced excitation wavelength. For this reason, the lower the excitation light wavelength, the more efficiently excitation light can be absorbed at a low concentration. The condition $0.8 < OD < 2$ is particularly preferable.

If the film thickness L is 10 μm or less, adhesion to the substrate improves, so this kind of thickness is preferable from a practical standpoint. Such thin films can be formed using the aforementioned sol-gel process. Specifically, with a sol-gel solution having an appropriate viscosity, a thin film can be produced by applying the sol-gel solution to a substrate by dipping, spin coating, or spreading. Forming the solution into a thin film in several cycles instead of a single cycle produces a stronger film. A film with a thickness of greater than 10 μm tends to peel off because of the difference in the coefficient of thermal expansion with respect to that of the substrate. Examples of such substrates include quartz glass substrates, borosilicate glass substrates, soda lime glass substrates, and other glass substrates; polycarbonate substrates, polymethyl methacrylate substrates, and other polymer substrates; internal and external surfaces of light bulbs and fluorescent lights; and light-reflecting mirror surfaces provided to liquid crystal projectors and the like.

Since the solid matrix of the present invention is produced using a sol-gel process, the matrix is often a porous body. For this reason, exposing the resulting phosphor to hydrogen, hydrogen sulfide, carbon monoxide, or other reducing gas allows the gas to diffuse throughout the solid matrix and to easily reach the surface of the superfine particles. The gas reacts with the dangling bonds and other defects on the surface and renders the superfine particles inactive, making it possible to raise the fluorescence quantum yield. This allows the solid matrix to be adequately used as a reaction site and produces favorable results because there is no aggregation of the superfine particles and no rapid growth of other precipitates due to changes in the conditions of the surface, unlike the reactions that occur in solution. Treating the phosphor with a reducing gas in this manner raises the fluorescence quantum yield about 5 to 10% in comparison with an untreated phosphor. The reducing gas treatment is particularly advantageous when the phosphor is formed as a thin film on the substrate.

The phosphor thus formed has fundamentally vitreous properties overall and possesses excellent mechanical characteristics, heat resistance, chemical stability, and other characteristics. In addition, the encapsulated semiconductor superfine particles are shielded from the outside atmosphere, and therefore have excellent light resistance and exceptionally good temporal stability. In comparison with polymers, glass has the highly valuable advantage of being resistant to ultraviolet excitation light.

A phosphor containing semiconductor superfine particles of the present invention consistently emits various colors under irradiation with single-wavelength ultraviolet light. Since the concentration of particles in the phosphor and excitation light intensity are optimized, a fluorescence intensity greater than that of an existing phosphor is obtained without the use of large lasers or the like. The product can therefore be used as a phosphor for high-brightness/high-definition display panels and other light-emitting devices.

BEST MODE FOR CARRYING OUT THE INVENTION

The present invention will now be described in further detail by using Examples, but the present invention should not be construed as being limited to these Examples.

Example 1

Superfine particles of cadmium telluride, which is a Group II-IV semiconductor, were manufactured in the following manner in accordance with the method of Gao et al. (*Journal of Physical Chemistry*, vol. 102, p. 8360 (1998)).

Specifically, a sodium hydrogen telluride solution was added to an aqueous solution of cadmium perchlorate (concentration: 0.013 mol/L) adjusted to a pH of 11.4 with vigorously stirring in the presence of thioglycolic acid ($HOOCCH_2SH$) as a surfactant under an argon atmosphere. In the process, the molar ratios of cadmium, tellurium, and thioglycolic acid were set to the optimum level of 1:0.47:2.43, and the amount of aqueous solution before the start of reaction was set to 60 mL. Cadmium telluride clusters were thereby formed, and the aqueous solution was refluxed for 10 hours under the atmosphere to allow the particles to grow to a sufficient degree. The wavelength of light emitted by excitation with ultraviolet light was 560 nm, which corresponds to a yellow emission. Observation under a transmission electron microscope showed that the average particle diameter was 4.1 nm and the standard deviation of the size distribution was 0.6 nm.

It was possible to confirm that the cadmium telluride superfine particles manufactured by this method had good monodisperse properties in water. Specifically, the aqueous solution obtained as described above was distilled, water was removed, and the pulverulent superfine particles of cadmium telluride were separated and redispersed in water, whereby it was possible to obtain a monodisperse aqueous solution indistinguishable from that at the start of the operation. The size of the superfine particles depended on the reflux time, and at a diameter of 10 nm or less, an increase in the size caused the color of emitted light to shift toward longer wavelengths due to so-called quantum size effects.

The concentration of cadmium telluride superfine particles in the reaction solution was about $3 \times 10^{-6}$ mol/L. The fluorescence quantum yield was estimated to be about 4% by drawing a comparison with solutions of rhodamine 6G, quinine, and other standard fluorescent pigments in accordance with the method of Dawson et al. described in the Background Art section of the present specification. Specifically, the quantum yield was calculated by setting the absorptivity at the excitation wavelength to about 0.1 and comparing with the value obtained by integrating the emission spectrum with respect to the wavelength. The fluorescence quantum yield thus derived did not change depending on the type of standard pigment used.

It was possible to disperse the semiconductor superfine particles thus produced in a silicon-containing matrix by a sol-gel process in accordance with the following method.

First, 1 mL of methanol was added to 20 mL of the reaction solution containing cadmium telluride, and the reaction mixture was thoroughly mixed with 0.1 mL of 3-aminopropyltrimethoxysilane (APS), which is an organoalkoxysilane having amino functional group. The resulting solution was poured into a Petri dish and allowed to stand for 6 hours in a fumehood. A sol-gel reaction was performed, whereupon the solution started to solidify. The product was allowed to stand for another 5 days, whereby it was possible to obtain a film-like sample.

FIG. 1 schematically shows the reaction. In the reaction, the amino groups electrostatically interact with the carboxyl groups of the surfactant located on the surface of the cadmium telluride superfine particles, preventing the superfine particles from aggregating and contributing to improved dispersibility.

The concentration of the cadmium telluride superfine particles in the film-like matrix thus manufactured was about $6 \times 10^{-4}$ mol/L.

Figure 2:
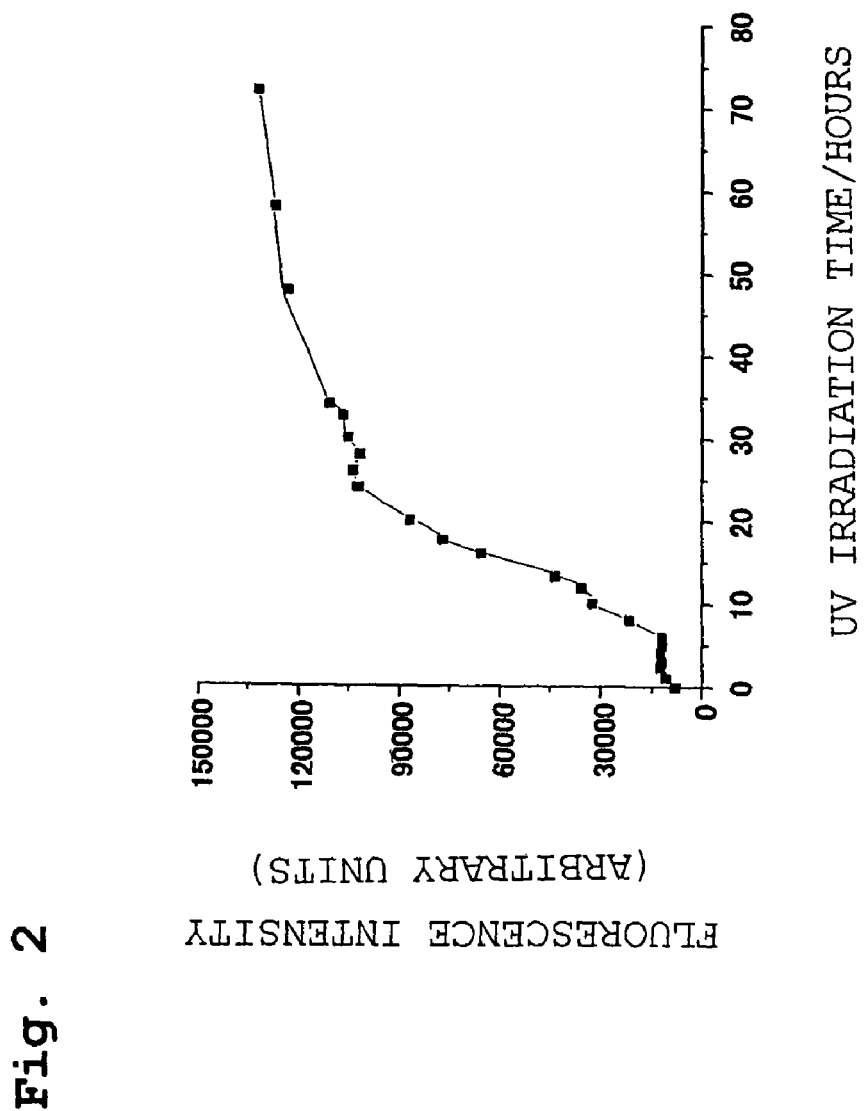
FIG. 2 is graph showing the relation between irradiation time and increase in luminescence intensity when ultraviolet light is used to irradiate the phosphor of the present invention in which cadmium telluride superfine particles are dispersed in a silicon-containing solid matrix.

The fluorescence quantum yield decreased to about 0.5% immediately after film manufacture. However, the fluorescence intensity was gradually increased by irradiation with ultraviolet light (intensity: about 50 mW/cm$^2$), the fluorescence quantum yield reached about 4% about three days later, and a stable state was established. FIG. 2 shows the variation of fluorescence intensities over time while irradiating with ultraviolet light. When the material for determining the quantum yield was a solid, as in this case, the estimate was obtained by preparing a cell with the same thickness as the solid, adding a standard fluorescent pigment with an appropriate concentration, and comparing the fluorescence intensities.

The film-like matrix was irradiated with ultraviolet light, and fluorescence intensity was determined. Specifically, an irradiation intensity of 5 W/cm$^2$ was easily obtained at an irradiation diameter of 1 cm in experiments in which a 250-W ultraviolet irradiation unit (manufactured by Ushio Inc.) was used. An intensity of about 60 W/cm$^2$ was obtained by focusing the beam about ten times the original level with a lens. The resulting sample was irradiated in this state, the fluorescence thus obtained was supplied to a silicon photodetector after the excitation ultraviolet light had been completely blocked with a UV-40 filter (manufactured by Asahi Techno Glass Corporation), and fluorescence intensity was measured. As a result, it was found that an about twofold increase in fluorescence intensity was obtained in comparison with a prior art case, namely when a manganese-doped zinc sulfide phosphor is excited at 0.03 W/cm$^2$.

Example 2

A phosphor was prepared using the same cadmium telluride superfine particles as in Example 1, except for using mercaptopropyltrimethoxysilane (MPS, see FIG. 3) instead of APS as the starting material for the matrix.

0.1 g MPS and 1 g methyl alcohol were first mixed and stirred. A solution was separately obtained by distilling the reaction solution containing the cadmium telluride superfine particles as described in Example 1 and concentrating the solution about tenfold. 20 mL of the concentrated solution was metered out, rapidly mixed with the MPS solution, poured into a Petri dish, and caused to undergo a sol-gel reaction to form a solid matrix. MPS disperses cadmium telluride superfine particles better than does APS, yielding a sufficiently high concentration of the superfine particles in the matrix. There was no reduction in fluorescence quantum yield due to the sol-gel reaction.

The concentration of superfine particles in the sample thus produced was about $1 \times 10^{-2}$ mol/L. The sample was irradiated with ultraviolet light at 3 W/cm$^2$ using the same device as in Example 1. The resulting fluorescence intensity was measured, and it was found that an intensity that was about twice that of current transition metal ion phosphors was obtained, and the intensity was at least five times the conventional intensity when the sample was irradiated with stronger ultraviolet light.

Example 3

A phosphor was produced using zinc selenide for the semiconductor superfine particles of the present invention.

An aqueous solution in which zinc selenide superfine particles had formed a monodisperse phase was first produced. Specifically, zinc perchlorate was dissolved in 60 mL of water and thioglycerol as a surfactant was successively dissolved therein to prepare an aqueous solution. Separately, aluminium selenide was then introduced into sulfuric acid, and the resulting hydrogen selenide was added to the aqueous solution. The molar ratio of zinc, selenium, and thioglycerol in the reaction solution was set to 1:0.47:1.7. The fluorescence intensity increased when the reaction solution was refluxed with stirring. This corresponded to blue emitted light with a peak wavelength at about 420 nm, and the fluorescence quantum yield was estimated to be about 4%. This method was the same as the method described by the inventors in already published literature (Murase, et al., *International Journal of Modern Physics*, B, vol. 15, p. 3881 (2001).

A phosphor was produced from the synthesized zinc selenide superfine particles by the sol-gel process using same MPS as in Example 2. The phosphor emitted blue light under irradiation with ultraviolet light, and the fluorescence quantum yield was estimated to be about 4%.

Example 4

Blue, green, and red phosphors can be produced by the methods described in Examples 1 to 3. Display prototypes were produced using three types of semiconductor superfine particulate dispersed phosphors thus produced. Methods similar to the phosphor coating methods used in the manufacture of Braun tubes were used in the process.

The produced phosphors were first pulverized into powders and then mixed with water and made into slurries (sludge). Such slurry (sludge) was mixed with a water-soluble photosensitive resin (obtained by adding ammonium dichromate to polyvinyl alcohol) and applied to a substrate. The contained moisture was evaporated off and the coated substrate was irradiated with light from a high-pressure mercury lamp through a shadow mask. The photosensitive resin was thereby cured and rendered insoluble to water only in the areas irradiated with light. When the substrate was washed in water immediately thereafter, the phosphor was left over only the photosensitive portions. This operation was repeated for each of the three types of phosphors.

The substrates with numerous minute fluorescent centers thus produced were spatially scanned with laser light by using a commercially available solid-state pulse laser with a wavelength of 355 nm (manufactured by Coherent; Compass Avia 355), and the display elements on a display were irradiated. The excitation light was pulsed light with a mean output A per second of 3 W/cm² and a duration t of 40 ns. The frequency N was 100 kHz. Accordingly, the excitation light intensity P was 750 W/cm² in accordance with formula (II) cited in the detailed description of the invention. The corresponding pulse diameter was about 0.5 him.

In this case, the light appeared as continuous light to the human eye because of the high frequency. Accordingly, the mean output was 3 W/cm² even when the mean value was calculated during the afterimage time (about 10 ms) of the human eye.

It was learned that the phosphors could emit light virtually without any brightness saturation despite the fact that the peak value of the laser pulse was very high (750 W/cm²). This is an exceptional feature of this type of phosphor unavailable with current phosphors based on transition metal ions or rare earth ions.

It was possible to eliminate light leakage and to prevent adjacent minute fluorescence centers from emitting light at the same time by synchronizing the pulsing frequency of the laser with the spatial scanning.

It was also possible to use a nitride semiconductor laser (wavelength: 390 nm) for ultraviolet excitation in order to achieve the goal whereby the size of the light source could be markedly reduced. In this case, it was possible to easily modulate the intensity of laser light by adjusting the electric current flowing through the laser.

Example 5

A phosphor material dispersed with semiconductor superfine particles was produced using cadmium selenide.

Specifically, cadmium selenide superfine particles were produced by a method referred to as the organometallic method. This is the method described by Bawendi, et al. in *Journal of Physical Chemistry*, B, vol. 101, p. 9463 (1997). Specifically, trioctyl phosphine selenide and dimethyl cadmium were thermally decomposed in trioctyl phosphine oxide, the surface of the thermal decomposition product was covered by molecules expressed as $HS(CH_2)_rCOONa$ (r>8), which is a type of thiol, and a monodisperse phase was formed in water. The diameter of the cadmium selenide superfine particles was about 3 nm, and the fluorescence quantum yield of emitted light was 20%, which is considerably high.

The cadmium selenide superfine particles were mixed with a mixture of lauryl methacrylate monomer, trioctylphosphine and MPS to the particle concentration of 5 vol %, and a polymerization agent (ethylene glycol dimethacrylate) and an initiation agent (azobisisobutyronitrile) were added thereto, and the mixture was heated to about 70° C. and solidified. The trioctylphosphine and MPS were added in order to make the superfine particles more dispersible. The corresponding concentration of cadmium selenide superfine particles in the matrix was about $8 \times 10^{-3}$ mol/L, and the fluorescence quantum yield was about 10%.

Irradiating this phosphor with ultraviolet light with an intensity of 3 W/cm² also produced stronger emitted light than that obtained from the existing phosphors.

Example 6

A quartz glass substrate was coated with a phosphor obtained in Example 1 using APS as a starting material, and a sol-gel reaction was carried out to form a thin film. The film was measured by a surface roughness meter after the reaction had been completed, whereupon the thickness L of the phosphor was found to be 9 µm. The phosphor was then irradiated with excitation light from a UV light-emitting diode with a wavelength of 375 nm. The molar absorption coefficient $\epsilon_\lambda$ of the superfine particles at this wavelength was about $18 \times 10^5$ L/(mol cm), and the concentration c was $6 \times 10^{-4}$ mol/L. As a result, the optical density OD was about 1.0, and about 90% of the excitation ultraviolet light was absorbed by the phosphor and converted to visible light. When the concentration of superfine particles was selected in such an appropriate manner, even a film with a thickness of 10 µm or less can be used for the phosphor.

The phosphor that had been bonded to a glass substrate was placed in a platinum wire basket and suspended in a conical flask located inside an inorganic chemistry fumehood. The flask was then sealed with a rubber stopper provided with two upright glass through-tubes, hydrogen sulfide gas was introduced and the contained gas was removed through the two glass tubes respectively, whereby the space inside the conical flask was filled with hydrogen sulfide. The system was allowed to stand for 5 hours in this state, and the glass substrate was then pulled out.

The fluorescence intensity was increased about 10% by exposure to hydrogen sulfide. This is believed to be due to the hydrogen sulfide diffusing into the porous glass matrix, reaching the superfine particles, bonding to their surfaces, and removing the defects.

Example 7

Ten ultraviolet semiconductor LEDs with a wavelength of 375 nm were aligned concentrically, and light was concentrated therefrom at a single location with a diameter of about 1 mm on the glass phosphor thin film produced in Example 6, whereupon a mean output of about 3 mW was obtained. Calculated in terms of output A per unit of surface area, this value was 0.38 W/cm². The corresponding pulse frequency N was 2 kHz, and the duration t was 50 microseconds. Accordingly, it follows from the same calculations as in Example 4 that the excitation light intensity P is 3.8 W/cm². This excitation light intensity can be considered to be more practical than that of Example 4.

The prior art literature cited in the present specification is incorporated herein by reference.

The invention claimed is:

1. A phosphor comprising a silicon-containing solid matrix and semiconductor superfine particles dispersed therein at a concentration of $5 \times 10^4$ to $1 \times 10^{-2}$ mol/L, said semiconductor superfine particles having a fluorescence quantum yield of 3% or greater and a diameter of 1.5 to 5 nm,
   wherein the semiconductor superfine particles have a surface coating of a material other than material found in the silicon-containing solid matrix,
   wherein the silicon-containing solid matrix is a glass matrix formed by a sol-gel process using an organoalkoxysilane, and
   wherein the organoalkoxysilane is a compound expressed by the formula:

$$X_n\text{—}Si(OR^1)_{4-n} \quad (I)$$

wherein X is a group expressed by $CH_2\text{=}CH\text{—}$, an oxirane-containing group, a group expressed by $H_2NC_mH_{2m}\text{—}$, a group expressed by $CH_2\text{=}C(CH_3)COOC_pH_{2p}\text{—}$, a group expressed by $HSC_qH_{2q}\text{—}$, or a phenyl group; $R^1$ is a lower alkyl group; n is 1, 2, or 3; m is an integer from 1 to 6; p is an integer from 1 to 5; and q is an integer from 1 to 10.

2. The phosphor according to claim 1, wherein the semiconductor superfine particles are substantially monodispersed in the silicon-containing solid matrix.

3. The phosphor according to claim 2, wherein the semiconductor superfine particles comprise at least one member selected from the group consisting of cadmium telluride, zinc telluride, zinc selenide, cadmium selenide, cadmium sulfide, indium arsenide, and indium phosphide.

4. The phosphor according to claim 3, wherein the semiconductor superfine particles comprise cadmium telluride, and the superfine particles are obtainable by adding a surfactant to an aqueous solution of cadmium perchlorate, adding hydrogen telluride or sodium hydrogen telluride, and then refluxing the mixture.

5. The phosphor according to claim 1, wherein the concentration of semiconductor superfine particles in the silicon-containing solid matrix is $1 \times 10^{-3}$ to $8 \times 10^{-3}$ mol/L.

6. A light-emitting device comprising the phosphor according to claim 1, and a light source for emitting excitation light with an intensity of 3 to 800 W/cm$^2$.

7. A light-emitting device comprising the phosphor according to claim 1, and a light source selected from the group consisting of a mercury lamp, a semiconductor light-emitting diode, a semiconductor laser, and a solid-state laser.

8. The light-emitting device according to claim 7, wherein the light source is a semiconductor light-emitting diode, semiconductor laser, or solid-state laser.

9. The light-emitting device according to claim 6, wherein the light source is an ultraviolet semiconductor light-emitting diode with an excitation wavelength of 200 nm or greater but less than 400 nm, or an ultraviolet semiconductor laser with an excitation wavelength of 200 nm or greater but less than 400 nm.

10. The light-emitting device according to claim 6, wherein the light source is an intermittently pulsing light source.

11. The light-emitting device according to claim 6, wherein the optical density (OD) of the phosphor at the excitation wavelength is 0.7<OD<5.

12. The light-emitting device according to claim 6, wherein the light-emitting device is a display panel or a light.

13. A method for manufacturing a display panel, wherein a slurry containing pulverized phosphor according to claim 1, a water-soluble photosensitive resin, and water, is applied to a substrate, and the resin is cured by irradiation with light.

14. A thin film comprising the phosphor according to claim 1.

15. The thin film according to claim 14, wherein the film thickness is 10 microns or less.

16. A method for forming a thin film comprising the phosphor according to claim 1, wherein the film is produced by a sol-gel process using an organoalkoxysilane.

17. A method for forming on a substrate a thin film comprising the phosphor according to claim 1, wherein the film is produced by a sol-gel process using an organoalkoxysilane.

18. A method for manufacturing the phosphor according to claim 1, wherein the semiconductor superfine particles are fixed in the silicon-containing solid matrix and are then exposed to a reducing gas.

19. The method for manufacturing a phosphor according to claim 18, wherein the semiconductor superfine particles are fixed in the silicon-containing solid matrix by a sol-gel process using an organoalkoxysilane and are then exposed to hydrogen gas or hydrogen sulfide gas.

* * * * *